United States Patent
Chang et al.

(10) Patent No.: US 11,720,321 B2
(45) Date of Patent: Aug. 8, 2023

(54) VEHICLE AND CONTROL METHOD THEREOF

(71) Applicants: Hyundai Motor Company, Seoul (KR); Kia Corporation, Seoul (KR)

(72) Inventors: Kyoung-Jin Chang, Suwon-si (KR); Dong Chul Park, Anyang-si (KR); Jinsung Lee, Hwaseong-si (KR); Sangjin Hong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 58 days.

(21) Appl. No.: 17/576,386

(22) Filed: Jan. 14, 2022

(65) Prior Publication Data

US 2022/0283773 A1    Sep. 8, 2022

(30) Foreign Application Priority Data

Mar. 2, 2021  (KR) .................. 10-2021-0027322

(51) Int. Cl.
| | |
|---|---|
| H04B 1/00 | (2006.01) |
| G06F 3/16 | (2006.01) |
| G06V 10/44 | (2022.01) |
| G06V 20/56 | (2022.01) |
| H04R 1/02 | (2006.01) |
| H04R 3/00 | (2006.01) |
| G06V 10/82 | (2022.01) |
| G06F 18/22 | (2023.01) |
| H03G 3/00 | (2006.01) |

(52) U.S. Cl.
CPC .............. *G06F 3/165* (2013.01); *G06F 18/22* (2023.01); *G06V 10/443* (2022.01); *G06V 10/82* (2022.01); *G06V 20/56* (2022.01); *H04R 1/025* (2013.01); *H04R 3/00* (2013.01); *H04R 2499/13* (2013.01)

(58) Field of Classification Search
CPC ....... G06F 3/165; G06F 18/22; G06V 10/443; G06V 10/82; G06V 20/56; H04R 1/025; H04R 3/00; H04R 2499/13
USPC ...................................... 381/86, 61
See application file for complete search history.

(56) References Cited

U.S. PATENT DOCUMENTS

| | | | |
|---|---|---|---|
| 2021/0286586 A1* | 9/2021 | Li | G06F 3/165 |
| 2022/0135081 A1* | 5/2022 | Lee | G06T 7/70 |
| | | | 701/23 |

* cited by examiner

*Primary Examiner* — Ammar T Hamid
(74) *Attorney, Agent, or Firm* — Slater Matsil, LLP

(57) ABSTRACT

An embodiment vehicle includes a camera, a speaker, and a controller electrically connected to the camera and the speaker, wherein the controller is configured to acquire a first external image outside the vehicle from the camera, input the first external image to a pre-trained first neural network and extract a first feature corresponding to the first external image, and control the speaker to output a first sound sample among a plurality of sound samples, based on a comparison of the first feature and pre-stored features corresponding to the plurality of sound samples.

20 Claims, 9 Drawing Sheets

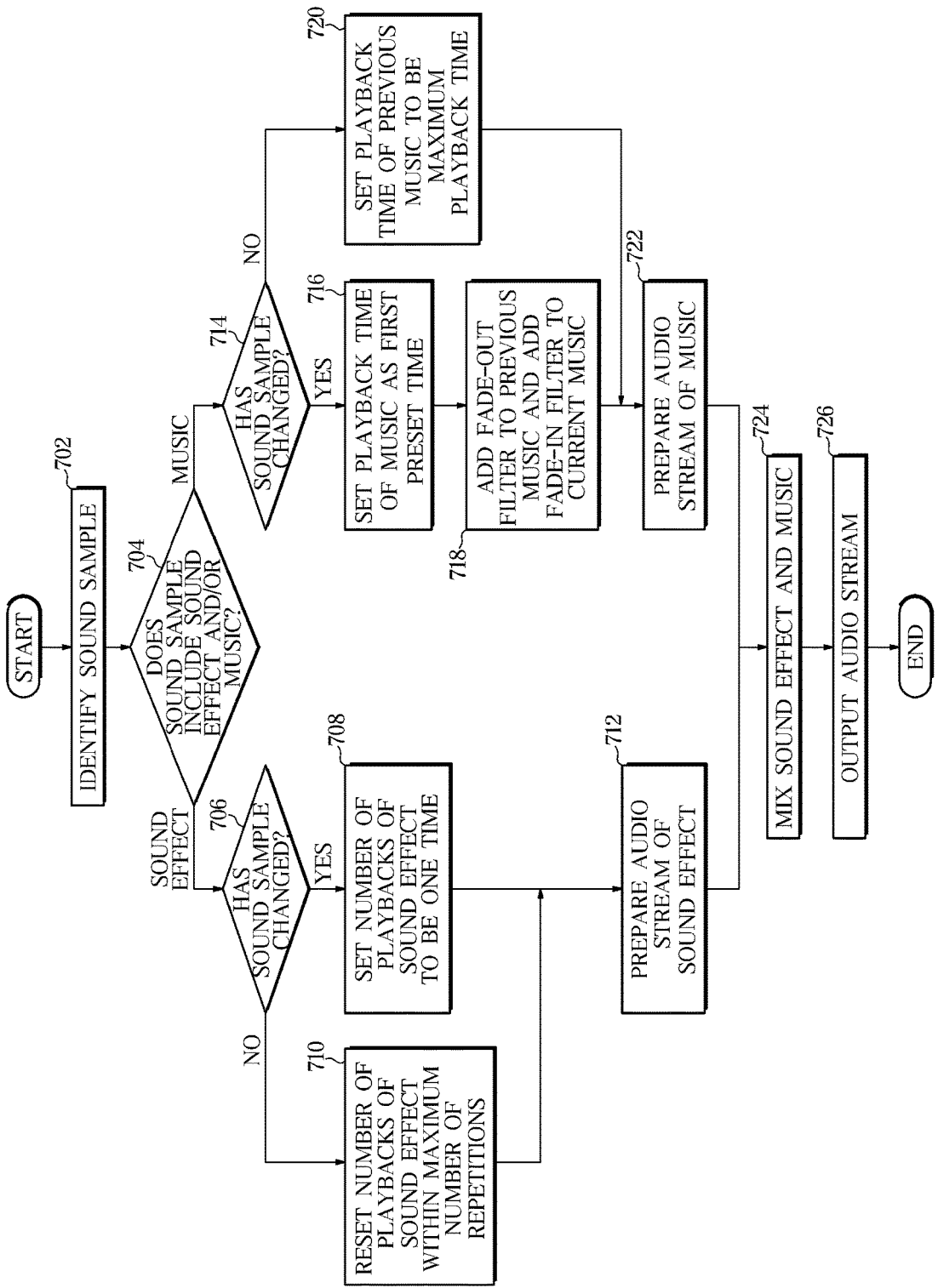

VEHICLE AND CONTROL METHOD THEREOF

CROSS-REFERENCE TO RELATED APPLICATIONS

This application claims the benefit of Korean Patent Application No. 10-2021-0027322, filed on Mar. 2, 2021, which application is hereby incorporated herein by reference.

TECHNICAL FIELD

The disclosure relates to a vehicle and a control method thereof.

BACKGROUND

Conventionally, while driving a vehicle, occupants in the vehicle may see a landscape outside the vehicle, but may not audibly feel natural environment. If an appropriate sound that harmonizes with the surrounding natural environment is provided during driving, the occupants in the vehicle may feel more comfortable and satisfied.

Although a technology that provides a user with a driving sound stored in advance has been developed, the conventional technology may not provide an occupant with a sound tailored to the external environment of the vehicle when driving.

SUMMARY

An embodiment of the disclosure provides a vehicle and a control method thereof that may provide an occupant with a sound that best suits an external environment such as a sound effect and/or music, during driving.

Additional embodiments of the disclosure will be set forth in part in the description which follows and, in part, will be obvious from the description, or may be learned by practice of the disclosure.

According to an embodiment of the disclosure, there is provided a vehicle comprising a camera, a speaker, and a controller electrically connected to the camera and the speaker, wherein the controller is configured to acquire a first external image outside the vehicle through the camera, input the first external image to a pre-trained first neural network which is pre-trained, extract a first feature corresponding to the first external image, compare the first feature and pre-stored features corresponding to a plurality of sound samples, and control the speaker to output a first sound sample among a plurality of sound samples.

The pre-trained first neural network is configured to extract a feature for identifying terrain information corresponding to the input first external image or emotional information predetermined to correspond to the terrain information.

The controller is configured to identify a second feature that is the most similar to the first feature among the pre-stored features corresponding to the plurality of sound samples, using a machine learning model, and select the first sound sample corresponding to the second feature.

The pre-stored features corresponding to the plurality of sound samples are extractable and storable based on learning of a second neural network to which a spectrum image of a time and a frequency is input, after converting each of the plurality of sound samples into the spectrum image of the time and the frequency.

The second neural network is configured to learn to extract a feature for identifying terrain information corresponding to the input spectrum image or emotional information predetermined to correspond to the terrain information.

The controller is further configured to acquire a second external image through the camera, in response to a lapse of a predetermined time after acquiring the first external image, input the second external image to the first neural network, extract a third feature corresponding to the second external image, compare the third feature and the pre-stored features corresponding to the plurality of sound samples, and select the first sound sample or a second sound sample different from the first sound sample among the plurality of sound samples.

When the first sound sample is selected from the plurality of sound samples and the first sound sample includes a first sound effect, the controller is configured to set a number of repeated playbacks of the first sound effect to be less than a predetermined maximum number of repetitions, and when the second sound sample is selected from the plurality of sound samples and the second sound sample includes a second sound effect, the controller is configured to set a number of repeated playbacks of the second sound effect to be a predetermined minimum number of repetitions.

When the first sound sample is selected from the plurality of sound samples and the first sound sample includes a first music, the controller is configured to set a playback time of the first music to be a predetermined maximum playback time, and when the second sound sample is selected from the plurality of sound samples and the second sound sample includes a second music, the controller is configured to set a playback time of the second music to be a predetermined basic playback time.

in response to the second sound sample being selected from the plurality of sound samples and the second sound sample including the second music, the controller is configured to apply a filter for fading out to data of the first music and apply a filter for fading in to data of the second music.

According to an embodiment of the disclosure, there is provided a control method of a vehicle, the control method comprising acquiring a first external image outside the vehicle through a camera, inputting the first external image to a pre-trained first neural network, extracting a first feature corresponding to the first external image, comparing the first feature to pre-stored features corresponding to a plurality of sound samples, and outputting a first sound sample among a plurality of sound samples, based on a result of the comparing.

The pre-trained first neural network extracts a feature for identifying terrain information corresponding to the input first external image or emotional information predetermined to correspond to the terrain information.

The control method further comprises identifying a second feature that is the most similar to the first feature among the pre-stored features corresponding to the plurality of sound samples, through a machine learning model and selecting the first sound sample corresponding to the second feature.

The pre-stored features corresponding to the plurality of sound samples are extracted and stored based on learning of a second neural network to which a spectrum image of a time and a frequency is input, after converting each of the plurality of sound samples into the spectrum image of the time and the frequency.

The second neural network learns to extract a feature for identifying terrain information corresponding to the input spectrum image or emotional information predetermined to correspond to the terrain information.

The control method further comprises acquiring a second external image through the camera, in response to a lapse of a predetermined time after acquiring the first external image, inputting the second external image to the first neural network, extracting a third feature corresponding to the second external image, comparing the third feature and the pre-stored features corresponding to the plurality of sound samples, and selecting the first sound sample or a second sound sample different from the first sound sample among the plurality of sound samples, based on a result of the comparing.

The control method further comprises, selecting the first sound sample from the plurality of sound samples, wherein the first sound sample includes a first sound effect, and setting a number of repeated playbacks of the first sound effect to be less than a predetermined maximum number of repetitions, or selecting the second sound sample from the plurality of sound samples, wherein the second sound sample includes a second sound effect, and setting a number of repeated playbacks of the second sound effect to be a predetermined minimum number of repetitions.

The control method further comprises, selecting the first sound sample from the plurality of sound samples, wherein the first sound sample includes a first music, and setting a playback time of the first music to be a predetermined maximum playback time, or selecting the second sound sample from the plurality of sound samples, wherein the second sound sample includes a second music, and setting a playback time of the second music to be a predetermined basic playback time.

The control method further comprises, in response to selecting the second sound sample from the plurality of sound samples and the second sound sample including the second music, applying a filter for fading out to data of the first music and applying a filter for fading in to data of the second music.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 7 is a flowchart illustrating operations of a vehicle according to an embodiment.

DETAILED DESCRIPTION OF ILLUSTRATIVE EMBODIMENTS

Figure 1:
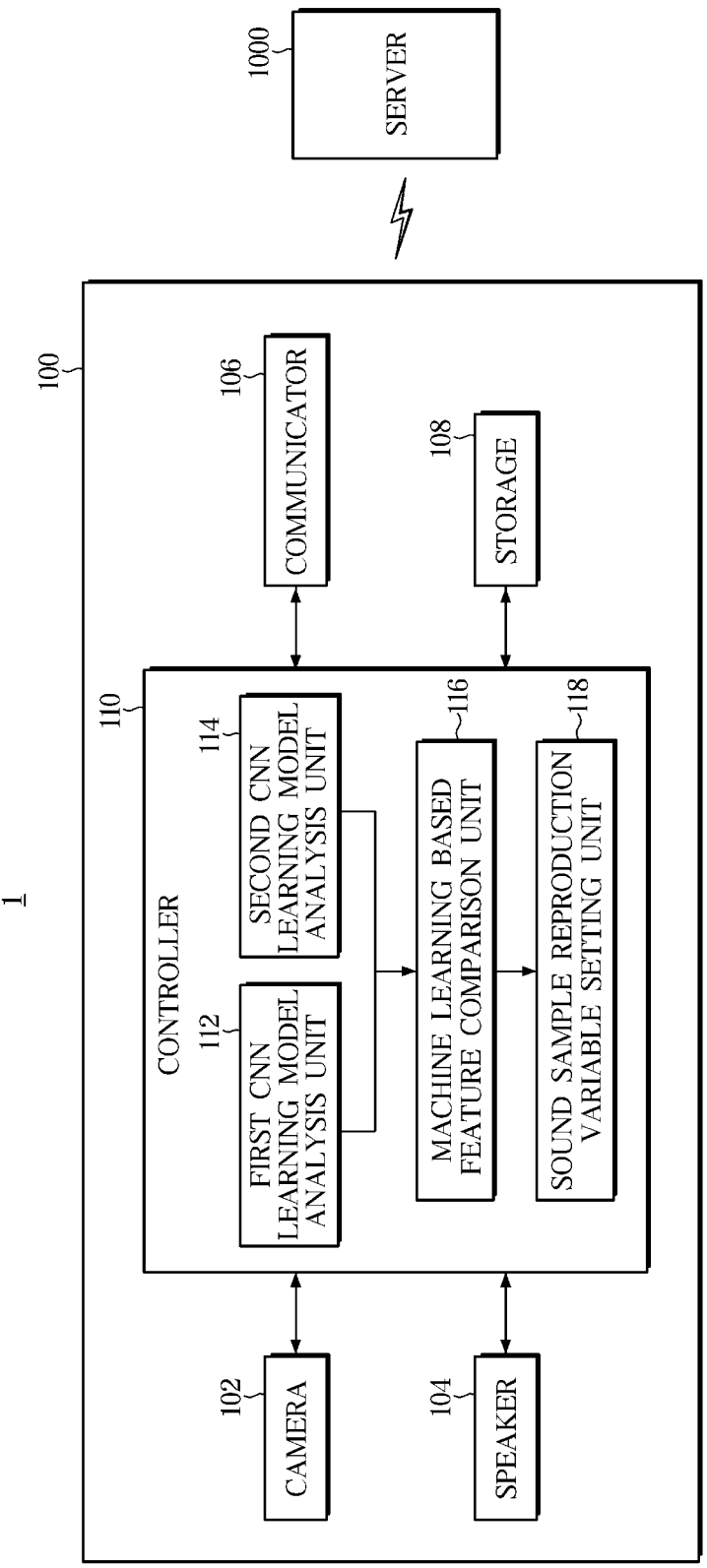
FIG. 1 is a block diagram illustrating a system including a vehicle and a server according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~device", "~module", and the like may refer to a unit for processing at least one function or act. For example, the terms may refer to at least process processed by at least one hardware or software. According to embodiments, a plurality of "~parts", "~devices", or "~modules" may be embodied as a single element, or a single of "~part", "~device", or "~module" may include a plurality of elements.

It will be understood that when an element is referred to as being "connected" to another element, it can be directly or indirectly connected to the other element, wherein the indirect connection includes "connection" via a wireless communication network.

It will be understood that the terms "include" when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms.

It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

Hereinafter, an operation principle and embodiments will be described in detail with reference to the accompanying drawings.

FIG. 1 is a block diagram illustrating a system 1 including a vehicle 100 and a server 1000 according to an embodiment.

Referring to FIG. 1, the vehicle 100 may include a camera 102, a speaker 104, a communicator 106, a storage 108, and/or a controller 110.

The camera 102 may photograph a still image and/or a video. The camera 102 may include an image sensor and a lens. Also, the camera 102 may acquire (or photograph) an image of an inside and/or outside of the vehicle 100 based on control of the controller 110.

A single camera 102 or a plurality of cameras 102 may be provided. The camera 102 has a field of view facing out from a front, a rear and/or a side of the vehicle 100, and may acquire an external image of the vehicle 100.

For instance, the camera 102 may include two cameras positioned at the front and the side of the vehicle 100, respectively, and acquire an image at a predetermined time interval, e.g. every 30 seconds, based on control of the controller 110.

The speaker 104 may change an electrical signal into a sound and output the sound.

The communicator 106 (also referred to as a communication device or communication circuit) may establish a wireless and/or wired communication channel between the vehicle 100 and an external device, e.g. the server 1000, and support communication through the established communication channel. Also, the communicator 106 may include a communication circuit. For example, the server 1000 may be a cloud server. Also, for instance, the communicator 106 may include a wired communication module (e.g. a power line communication module) and/or a wireless communication module (e.g. a global positioning system (GPS) module, a cellular communication module, a Wi-Fi communication module, a local wireless communication module and/or a Bluetooth communication module), and may communicate with the external device using a corresponding communication module among the communication modules above.

The communicator 106 may include a communication circuit (also referred to as a transceiver) capable of performing communication among constituent components (also referred to as devices) of the vehicle 100, e.g. a controller area network (CAN) communication and/or a local interconnect network (LIN) communication, and a control circuit that controls operations of the communication circuit, through a communication network for the vehicle.

The storage 108 may store various data used by at least one other constituent component (the camera 102, the speaker 104, the communicator 106 and/or the controller 110) of the vehicle 100. For example, the storage 108 may store a software program and input data or output data about commands related to the software program. The storage 108 may include a volatile memory and/or a non-volatile memory.

The controller 110 (also referred to as a control circuit or a processor) may control at least one other constituent component (e.g. a hardware constituent component such as the camera 102, the speaker 104, the communicator 106 and/or the storage 108, or a software constituent component such as a software program) of the vehicle 100. Also, the controller 110 may perform various data processing and data operations. The controller 110 may include an electronic control unit (ECU) that controls a power system of the vehicle 100. The controller 110 may include a processor and a memory.

The controller 110 may be referred to as a soundscape providing system.

The controller 110 may analyze a feature of an image acquired by the camera 102 in real time.

The controller 110 may analyze the feature of the image through a pre-trained first neural network algorithm of the storage 108 of the vehicle 100 or the server 1000.

For example, the first neural network algorithm may include a first convolutional neural network (CNN) algorithm (also referred to as a visual CNN algorithm).

The first CNN algorithm is an algorithm for extracting a feature corresponding to an image through a CNN (also referred to as a first CNN model or a first CNN-based deep learning model) that learns through input images.

For example, the first CNN algorithm may classify the image by generating a label of a terrain (e.g. a riverside, a beach, a highway, a forest road and/or a city center, etc.) with respect to the image and learning the labeled image.

As another example, the first CNN algorithm may perform sophisticated classification of the image by classifying the image into a terrain and emotion (e.g. pleasure, excitement, sadness, depression, loneliness, and/or calm, etc.), generating a label in a complex form (e.g. riverside-pleasure, beach-excitement, etc.) with respect to the classified image and learning the labeled image.

The controller 110 may select a sound sample that suits an acquired image, based on a sound sample-based feature database that may harmonize with terrains and/or emotions. In this instance, the sound sample-based feature database may be stored in the storage 108 or received through communication with the server 1000 through the communicator 106.

For instance, the server 1000 or the storage 108 may generate a feature database by learning a variety of sound samples through a second neural network algorithm. For example, the second neural network algorithm may include a second CNN algorithm (also referred to as an audio CNN algorithm).

The second CNN algorithm may be an algorithm for extracting a feature by generating a spectrum image of a time and a frequency based on a short time Fourier transform (STFT) of a sound sample, and then learning a second CNN (also referred to as a second CNN model or a second CNN-based deep learning model) to which the spectrum image of the time and the frequency is input. Also, other algorithms may be applied to the second CNN algorithm.

The controller 110 may include a first CNN learning model analysis unit 112, a second CNN learning model analysis unit 114, a machine learning-based feature comparison unit 116, and a sound sample reproduction variable setting unit 118.

The first CNN learning model analysis unit 112 may input the external image acquired through the camera 102 while the vehicle 100 is driving to a first CNN, and extract a feature of the real-time driving environment of the vehicle 100 through the first CNN algorithm.

The second CNN learning model analysis unit 114 may input a plurality of sound samples to the second CNN, extract features of the driving environment of the vehicle 100 through the second CNN algorithm, and thereby may collect a feature database.

Each of the plurality of sound samples may include a sound effect and/or music.

For instance, the sound effect may include a bird sound and/or the sound of waves, and the like. Also, the music may include a piano piece and/or a flute piece.

The machine learning-based feature comparison unit 116 may compare a feature corresponding to an image output from the first CNN learning model analysis unit 112 and the feature database collected based on the plurality of sound samples output from the second CNN learning model analysis unit 114, and thereby may identify a feature which is the most similar to the feature corresponding to the image output from the first CNN learning model analysis unit 112 from among the feature database. Also, the machine learning-based feature comparison unit 116 may identify a sound sample of the identified feature.

The machine learning-based feature comparison unit 116 may compare a feature of an image and a feature of a sound, and thereby may identify a sound sample through a machine learning model that selects a sound sample which is the most similar to the feature of the image.

For example, comparison between the feature of the image and the feature database may be performed through a Kullback-Leibler (KL) divergence method, and the like. In the KL divergence method, a difference between probability distributions of two data is calculated, and features with a smallest difference are determined to be similar to each other and may be calculated by minimizing cross entropy of data.

The sound sample reproduction variable setting unit 118 may identify whether the sound sample identified through the machine learning-based feature comparison unit 116 includes the sound effect and/or the music.

When the identified sound sample includes the sound effect and an external environment of the vehicle 100 driving does not change significantly, the sound sample reproduction variable setting unit 118 may set the sound effect to be reproduced within a predetermined maximum number of playbacks so that reproduction of the sound effect is not excessively repeated.

When the identified sound sample includes the music and the external environment of the vehicle 100 driving does not change significantly, the sound sample reproduction variable setting unit 118 may set a previously selected and reproduced music to be extended so that the previously selected music is not reproduced again from a beginning.

When the music is required to be changed according to a newly identified sound sample, the sound sample reproduction variable setting unit 118 may apply a filter for fading in (also referred to as a fade-in filter) to data of the music included in the newly identified sound sample, and apply a filter for fading out (also referred to as a fade-out filter) to data of the music included in a previous sound sample, in order to prevent significant change from occurring.

When the identified sound sample includes the sound effect and the music, the sound sample reproduction variable setting unit 118 may mix the sound effect and the music, and thereby may naturally output the mixed sound effect and music through the speaker 104.

The above-described first CNN, the second CNN and/or the sound sample-based feature database may be stored in the server 1000 which is an external device, may be received based on the communication with the server 1000 through the communicator 106, or may be stored in the storage 108.

Meanwhile, the vehicle 100 may include an audio device (not shown), and the sound effect and/or the music may be output by the speaker 104 through the audio device.

Hereinafter, operations of the controller 110 are described in greater detail with reference to FIGS. 2 to 6.

Figure 2:
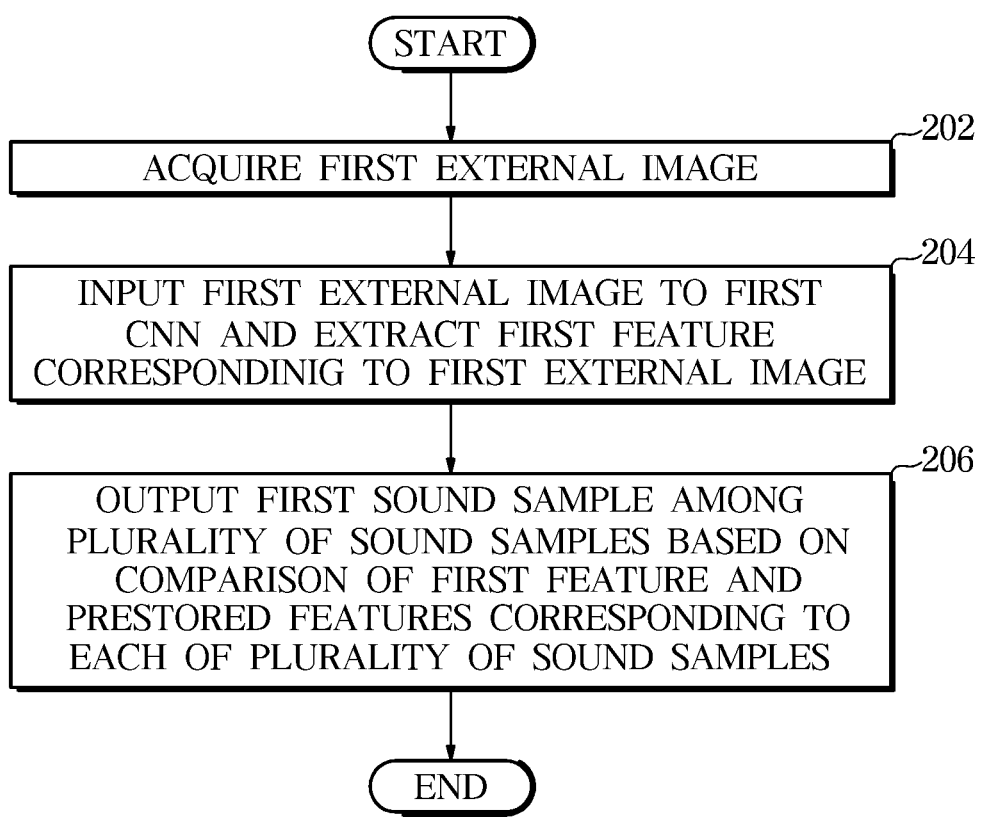
FIG. 2 is a flowchart illustrating operations of a vehicle according to an embodiment.
Figure 3:
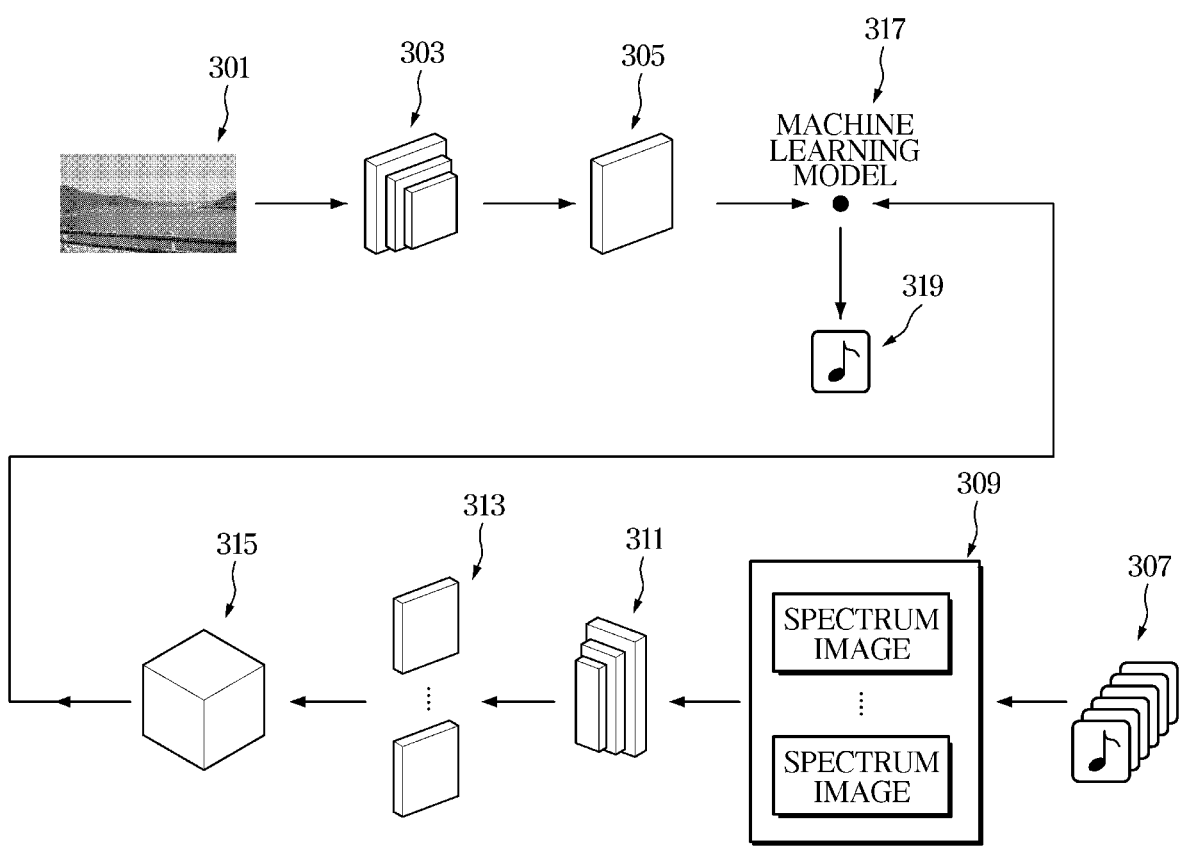
FIG. 3 is a diagram illustrating operations of selecting a sound sample of a vehicle according to an embodiment.

FIG. 2 is a flowchart illustrating operations of the vehicle 100 (or the controller 110 of the vehicle 100) according to an embodiment. FIG. 3 is a diagram illustrating operations of selecting a sound sample of the vehicle 100 (or the controller 110 of the vehicle 100) according to an embodiment.

Referring to FIGS. 2 and 3, the vehicle 100 may acquire a first external image 301 of the vehicle 100 through the camera 102 (202).

For example, the first external image 301 may be an image of a coastal road as shown in FIG. 3.

The vehicle 100 may input the first external image 301 to a pre-trained first neural network, e.g., a first CNN 303, and extract a first feature 305 corresponding to the first external image 301 (204).

The first CNN 303 may be pre-trained to extract a feature for identifying terrain information corresponding to the input first external image 301 or emotional information predetermined to correspond to the terrain information. An embodiment of learning of the first CNN 303 will be described later with reference to FIG. 4.

The first feature 305 is a feature corresponding to a driving environment of the vehicle 100, and may include a feature for identifying the terrain information corresponding to the first external image 301.

The vehicle 100 may control the speaker 104 to output a first sound sample 319 among a plurality of sound samples 307, based on a comparison of the first feature 305 and pre-stored features 313 corresponding to each of the plurality of sound samples 307 (206).

The plurality of sound samples 307 may be referred to as a sound sample database.

The pre-stored features 313 corresponding to each of the plurality of sound samples 307 may be extracted and stored based on learning of a second neural network, e.g. a second CNN 311, to which a spectrum image 309 of a time and a frequency is input, after converting each of the plurality of sound samples 307 into the spectrum image 309 of the time and the frequency.

For instance, the second CNN 311 may be pre-trained to extract a feature corresponding to a driving environment of the vehicle 100 corresponding to the input spectrum image 309. An embodiment of learning of the second CNN 311 will be described later with reference to FIG. 5.

For example, the feature corresponding to the driving environment of the vehicle 100 corresponding to the input spectrum image 309 may include the feature for identifying the terrain information or emotional information predetermined to correspond to the terrain information.

The pre-stored features 313 corresponding to each of the plurality of sound samples 307 may be databased and stored in a sound sample-based feature database 315.

The vehicle 100 may identify a second feature which is the most similar to the first feature 305 among the pre-stored features 313 corresponding to each of the plurality of sound samples 307, through a machine learning model 317, and may select the first sound sample 319 of the second feature.

The second feature is a feature corresponding to a driving environment of the vehicle 100 corresponding to the input spectrum image 309, and may include a feature for identifying terrain information corresponding to the first sound sample 319.

In addition to the embodiment described above, the vehicle 100 may acquire a second external image through the camera 102, in response to a lapse of a predetermined time after acquiring the first external image 301. Also, the vehicle 100 may input the second external image to the first CNN 303 and extract a third feature corresponding to the second external image. The vehicle 100 may select the first sound sample 319 or a second sound sample different from the first sound sample 319 among the plurality of sound samples 307, based on a comparison of the third feature and the pre-stored features 313 corresponding to each of the plurality of sound samples 307.

According to the operations described above, when the first sound sample 319 is selected from the plurality of sound samples 307 and the selected first sound sample 319 includes a first sound effect, the vehicle 100 may set the number of repeated playbacks of the first sound effect to be less than a predetermined maximum number of repetitions.

According to the operations described above, when the second sound sample is selected from the plurality of sound samples 307 and the second sound sample includes a second sound effect, the vehicle 100 may set the number of repeated playbacks of the second sound effect to be a predetermined minimum number of repetitions.

According to the operations described above, when the first sound sample 319 is selected from the plurality of sound samples 307 and the first sound sample 319 includes a first music, the vehicle 100 may set a playback time of the first music to be a predetermined maximum playback time.

According to the operations described above, when the second sound sample is selected from the plurality of sound samples 307 and the second sound sample includes a second music, the vehicle 100 may set a playback time of the second music to be a predetermined basic playback time. Also, when the second sound sample is selected from the plurality of sound samples 307 and the second sound sample includes the second music, the vehicle 100 may apply a filter for fading out to data of the first music and apply a filter for fading in to data of the second music.

Figure 4:
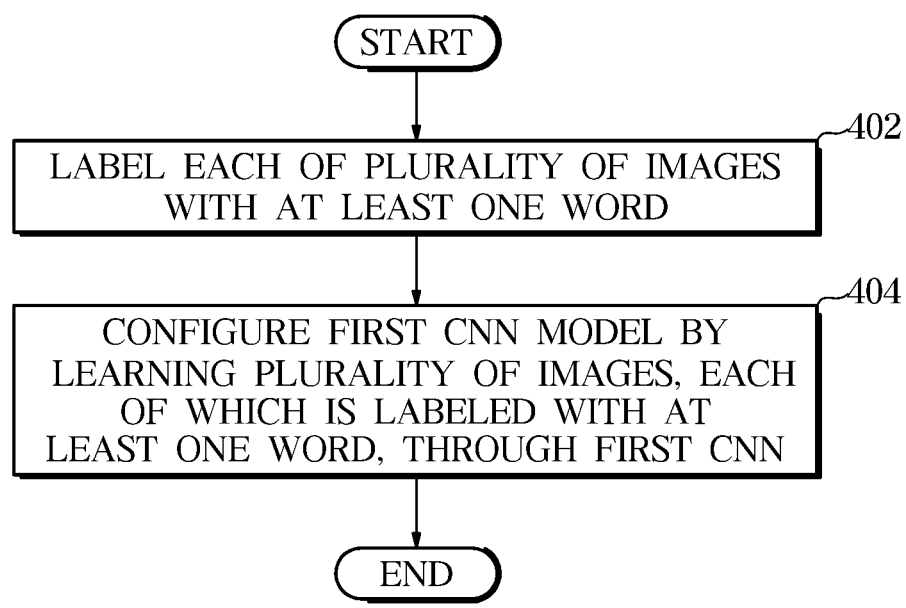
FIG. 4 is a flowchart illustrating learning operations of a first convolutional neural network (CNN) according to an embodiment.

FIG. 4 is a flowchart illustrating learning operations of a first CNN according to an embodiment.

The learning operations of the first CNN may be performed by the vehicle 100 (and/or the controller 110 of the vehicle 100) and/or an external electronic device such as the server 1000 (and/or a controller (not shown) of the server 1000), and the like.

The vehicle 100 and/or the electronic device may label each of a plurality of images for learning a driving environment with at least one word (402).

The at least one word may include terrain information corresponding to an image and/or emotional information predetermined to correspond to the terrain information.

For example, the terrain information may be various terrains such as a riverside, a beach, a highway, a forest road and/or a city center, and the like. Also, the emotional information predetermined to correspond to the terrain information may be various emotions such as pleasure in a case of the riverside and/or excitement in a case of the beach, and the like.

The vehicle 100 and/or the electronic device may configure a first CNN model by learning the plurality of images, each of which is labeled with the at least one word, through the first CNN (404).

The first CNN model may be trained to extract a feature corresponding to the driving environment of the vehicle 100 corresponding to an input image.

For instance, the feature corresponding to the driving environment of the vehicle 100 may include a feature for identifying terrain information corresponding to the input image or emotional information predetermined to correspond to the terrain information.

Figure 5:
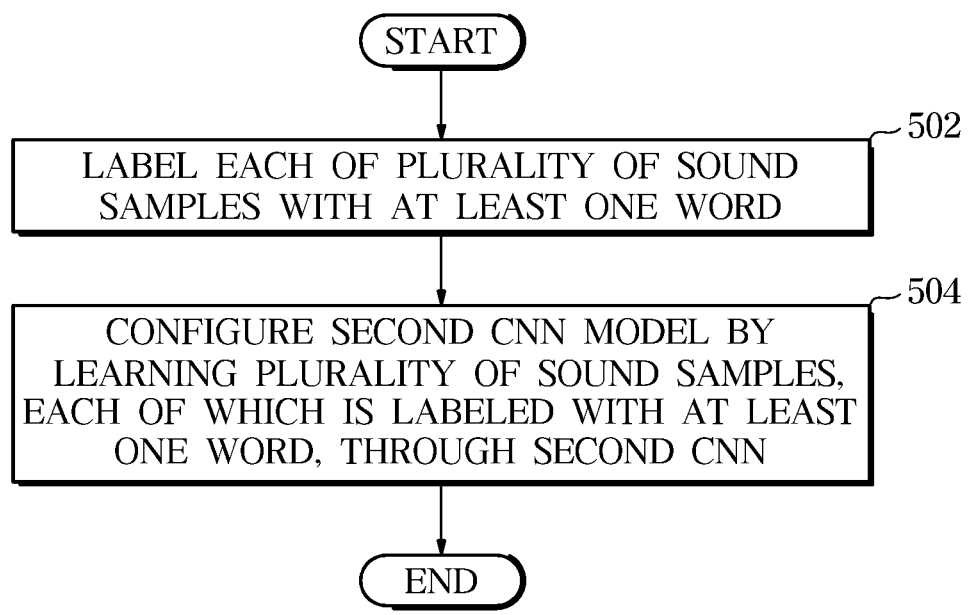
FIG. 5 is a flowchart illustrating learning operations of a second CNN according to an embodiment.

FIG. 5 is a flowchart illustrating learning operations of a second CNN according to an embodiment.

The learning operations of the second CNN may be performed by the vehicle 100 (and/or the controller 110 of the vehicle 100) and/or an external electronic device such as the server 1000 (and/or a controller (not shown) of the server 1000), and the like.

The vehicle 100 and/or the electronic device may label each of a plurality of sound samples with at least one word (502).

The at least one word may include terrain information predetermined to correspond to a sound sample and/or emotional information predetermined to correspond to the terrain information.

For example, the terrain information may be various terrains such as a riverside, a beach, a highway, a forest road and/or a city center, and the like. Also, the emotional information predetermined to correspond to the terrain information may be various emotions such as pleasure in a case of the riverside and/or excitement in a case of the beach, and the like.

The vehicle 100 and/or the electronic device may configure a second CNN model by learning the plurality of sound samples, each of which is labeled with the at least one word, through the second CNN (504).

The vehicle 100 may perform learning of the second CNN model to which a spectrum image of a time and a frequency is input, after converting each of the plurality of sound samples into the spectrum image of the time and the frequency.

The second CNN model may be trained to extract a feature corresponding to a driving environment of the vehicle 100 corresponding to an input sound sample.

For instance, the feature corresponding to the driving environment of the vehicle 100 may include a feature for identifying terrain information corresponding to the input sound sample or emotional information predetermined to correspond to the terrain information.

Figure 6:
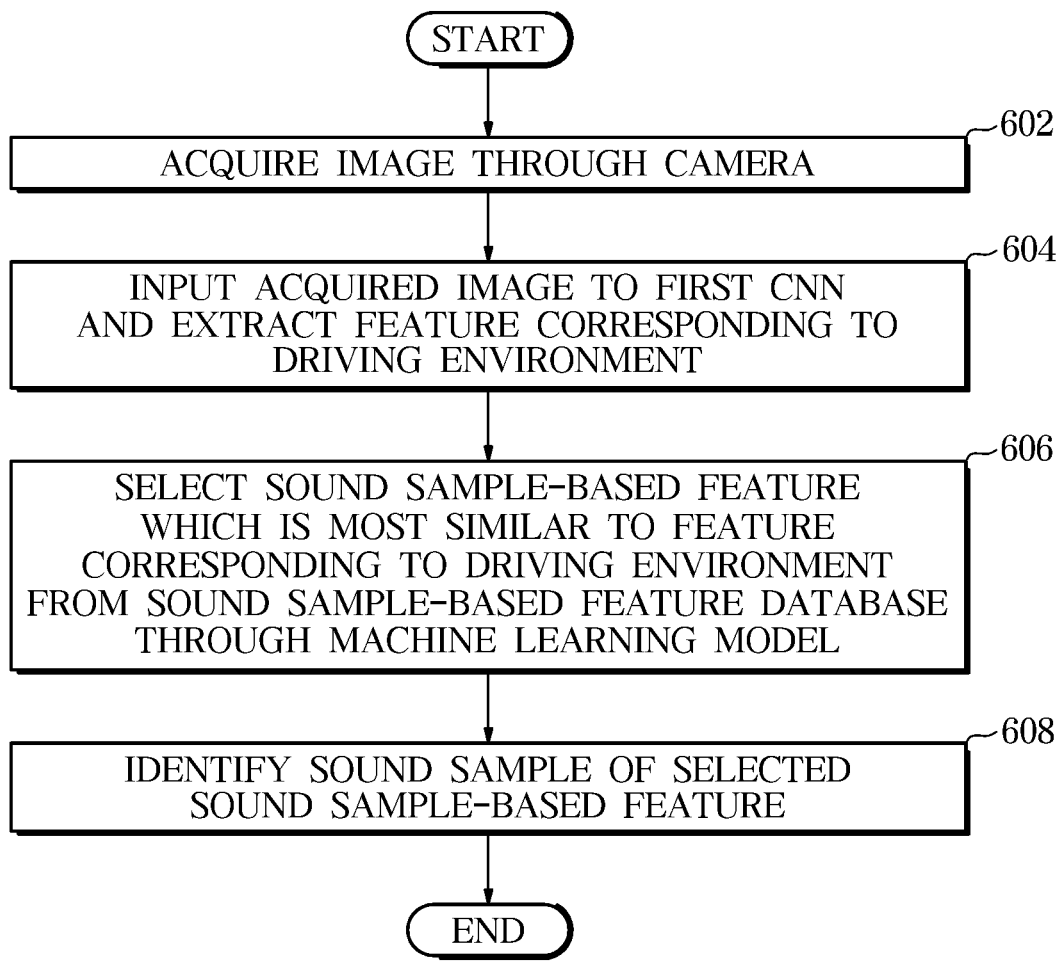
FIG. 6 is a flowchart illustrating operations of a vehicle according to an embodiment.

FIG. 6 is a flowchart illustrating operations of the vehicle 100 (or the controller 110 of the vehicle 100) according to an embodiment.

The vehicle 100 may acquire an image through the camera 102 (602).

The vehicle 100 may acquire an external image of the vehicle 100 at a predetermined time interval, e.g., every 30 seconds, during driving through the camera 102.

The vehicle 100 may input the acquired external image to a pre-trained first CNN, and extract a feature corresponding to a driving environment of the vehicle 100 (604).

The first CNN may be a first CNN model trained to receive images of various driving environments as input and extract a feature.

The vehicle 100 may select a sound sample-based feature which is the most similar to the feature corresponding to the driving environment from a sound sample-based feature database, through a machine learning model (also referred to as a machine learning technique) (606).

The vehicle 100 may compare the feature corresponding to the driving environment and sound sample-based features of the sound sample-based feature database, and thereby may identify a sound sample-based feature which is the most similar to the feature corresponding to the driving environment among the sound sample-based features of the sound sample-based feature database, through a KL divergence method.

The vehicle 100 may identify a sound sample of the selected sound sample-based feature (608).

The sound sample may include a sound effect and/or music.

According to the embodiment described above with reference to FIG. 6, when it is assumed that the sound sample is selected at a predetermined time interval (time period), e.g. every 30 seconds, the vehicle 100 may naturally output a sound through the speaker 104 according to a driving environment of the vehicle 100. For instance, the vehicle 100 may output the sound through the speaker 104 without interruption or fluctuation at an appropriate time according to a driving environment of the vehicle 100 and according to a type of the selected sound sample. An embodiment that the vehicle 100 outputs a sound is described in detail with reference to FIG. 7.

FIG. 7 is a flowchart illustrating operations of the vehicle 100 (or the controller 110 of the vehicle 100) according to an embodiment.

Referring to FIG. 7, the vehicle 100 may identify a sound sample according to the operations described above with reference to FIG. 6 (702).

The vehicle 100 may identify whether the identified sound sample includes a sound effect and/or music (704).

When the identified sound sample includes the sound effect, the vehicle 100 may perform an operation 706. When the identified sound sample includes the music, the vehicle 100 may perform an operation 714.

When the identified sound sample includes the sound effect, the vehicle 100 may identify whether the sound sample has changed (706).

When a currently identified sound sample is different from a previously identified sound sample, the vehicle 100 may identify that the sound sample has changed. When the currently identified sound sample is the same as the previously identified sound sample, the vehicle 100 may identify that the sound sample has not changed.

When the identified sound sample has changed, the vehicle 100 may perform an operation 708. When the identified sound sample has not changed, the vehicle 100 may perform an operation 710.

The vehicle 100 may set the number of playbacks of the sound effect to be one time (708).

The vehicle 100 may reset the number of playbacks of the sound effect within a maximum number of repetitions (710).

For example, the maximum number of repetitions may be three times.

The vehicle 100 may prepare an audio stream of the sound effect in response to the operation 708 or the operation 710 (712).

When the identified sound sample includes the music, the vehicle 100 may identify whether the sound sample has changed (714).

When a currently identified sound sample is different from a previously identified sound sample, the vehicle 100 may identify that the sound sample has changed. When the currently identified sound sample is the same as the previously identified sound sample, the vehicle 100 may identify that the sound sample has not changed.

When the identified sound sample has changed, the vehicle 100 may perform an operation 716. When the identified sound sample has not changed, the vehicle 100 may perform an operation 720.

When the identified sound sample has changed, the vehicle 100 may set a playback time of the music included in the identified sound sample as a first preset time (716).

The first preset time may be referred to as an initial basic playback time, for example, 30 seconds.

The vehicle 100 may add a fade-out filter to the previous music included in the previous sound sample, and add a fade-in filter to the current music included in the current sound sample (718).

When the identified sound sample has not changed, the vehicle 100 may set a playback time of the previous music to be a predetermined maximum playback time (720).

For example, the predetermined maximum playback time may be 3 minutes.

The vehicle 100 may prepare an audio stream of the music in response to the operation 718 or the operation 720 (722).

When the identified sound sample includes both the sound effect and the music, the vehicle 100 may mix the sound effect and the music (724).

When the identified sound sample includes either the sound effect or the music, the vehicle 100 may omit the operation 724.

The vehicle 100 may output the audio stream (726).

The vehicle 100 may output the audio stream according to the operation 712, the audio stream according to the operation 722, or the audio stream according to the operation 724.

It has been described in the embodiment of FIG. 7 that the number of playbacks of the sound effect is set to be one time when the sound sample is identified to be changed in operation 706. According to another embodiment, however, the number of playbacks of the sound effect may be set to be one time when the sound sample is first identified, according to a start of driving of the vehicle 100.

Also, it has been described in the embodiment of FIG. 7 that the playback time of the music is set as the first preset time when the identified sound sample is identified to be changed in operation 714. According to another embodiment, however, the playback time of the music may be set as the first preset time when the sound sample is first identified, according to a start of driving of the vehicle 100.

According to the embodiment of FIG. 7, the vehicle 100 may set a variable for reproducing a corresponding audio stream differently according to whether the sound sample identified based on an acquired image includes the sound effect or the music.

When the sound sample includes the sound effect and a sound sample identified before the currently identified sound sample does not exist (when an initial playback is performed), the vehicle 100 may set a playback time as the first preset time, i.e. the initial basic playback time, and output the sound effect. Afterwards, when a following image is acquired but the identified sound sample is the same as before, the vehicle 100 may repeatedly reproduce the sound sample up to a predetermined maximum number of repetitions to prevent boredom due to repetitions.

When the identified sound sample includes the music and a sound sample identified before the currently identified sound sample does not exist, the vehicle 100 may set the playback time as the first preset time, i.e. the initial basic playback time, and output the music. Afterwards, when a following image is acquired but the identified sound sample is the same as before, the vehicle 100 may reproduce the music up to a preset maximum playback time by extending the current music without reproducing the music again from the beginning, and thereby may reduce a feeling that the music is cut short.

When a sound sample including music is identified and then a sound sample including another music is identified, the vehicle 100 may add a fade-out filter to a previously identified sound sample, and add a fade-in filter to a currently identified sound sample, and thereby may enable two different pieces of music to be naturally connected to each other. When the sound sample includes both the sound effect and the music, the vehicle 100 may set a variable for reproducing the sound effect and a variable for reproducing the music, respectively, and mix the sound effect and the music to output the audio stream.

The operations described above according to the embodiment of FIG. 7 may be repeatedly performed according to a predetermined time period for acquiring an image.

According to the embodiments described above, the vehicle 100 may provide a soundscape based on an image surrounding the vehicle 100. The vehicle 100 may acquire the image through the camera 102 to recognize a surrounding environment of the vehicle 100. The vehicle 100 may perform a deep learning-based image-sound extraction by inputting the acquired image to a first CNN, extracting a feature of the image, comparing the feature of the image and a feature of a sound sample, and selecting a sound sample that suits the image. Also, the vehicle 100 may set an appropriate variable according to a driving environment of the vehicle 100 to reproduce the selected sound sample.

FIGS. 8A, 8B, 8C and 8D are diagrams illustrating implementation of a soundscape for each image according to a driving environment of the vehicle 100 according to an embodiment.

Figure 8A:
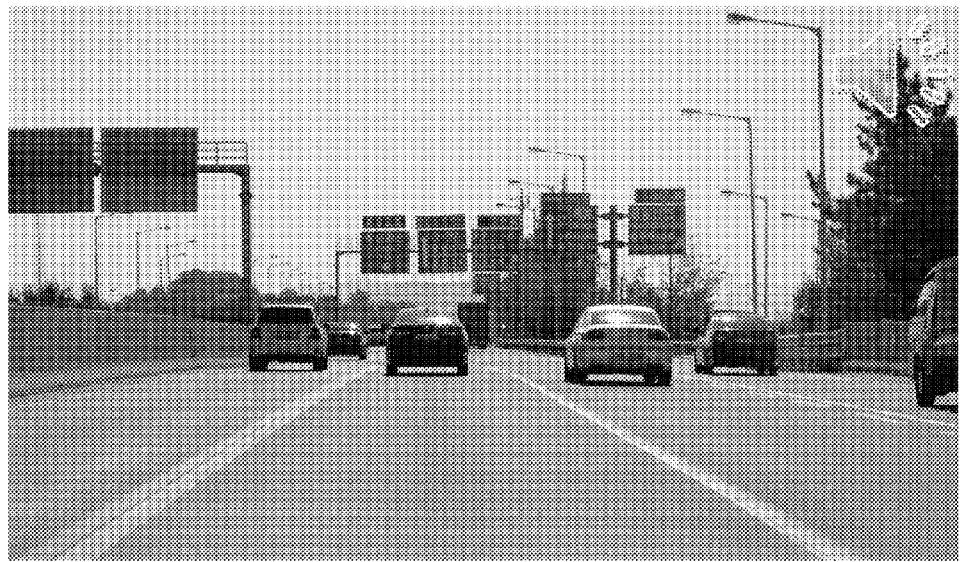
FIGS. 8A, 8B, 8C and 8D are diagrams illustrating implementation of a soundscape for each image according to a driving environment of a vehicle according to an embodiment.
Figure 8B:
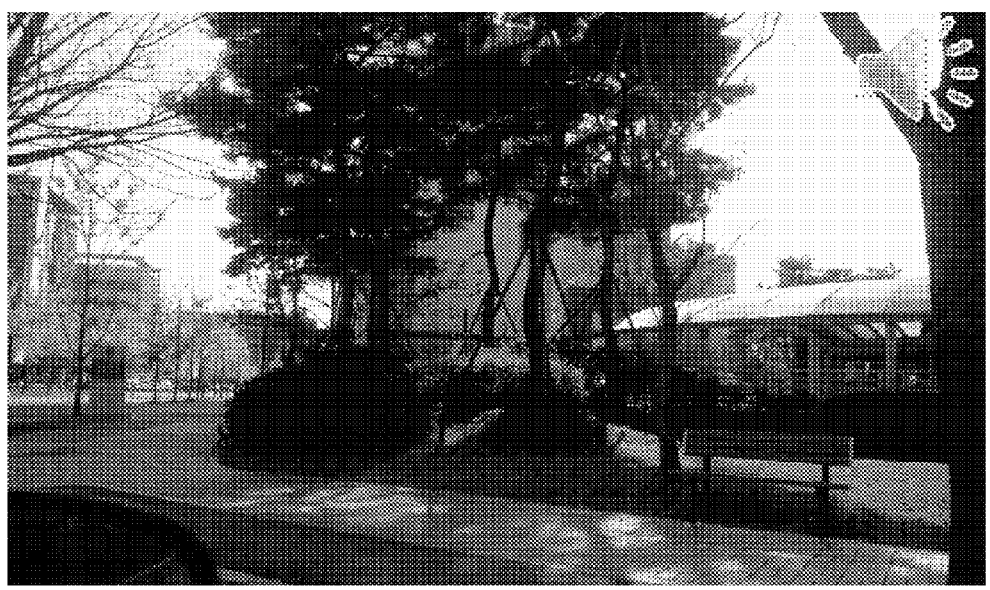
Figure 8C:
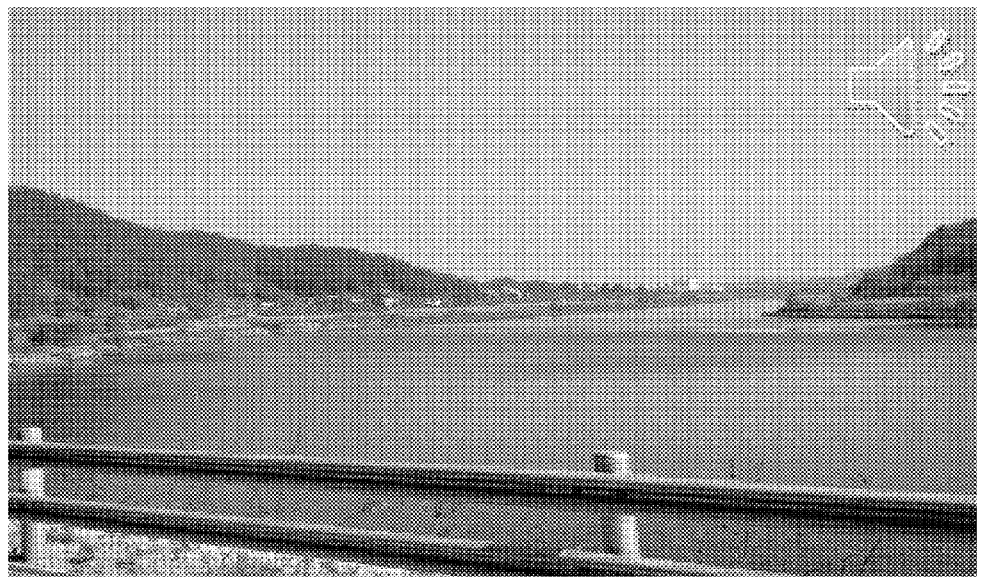
Figure 8D:
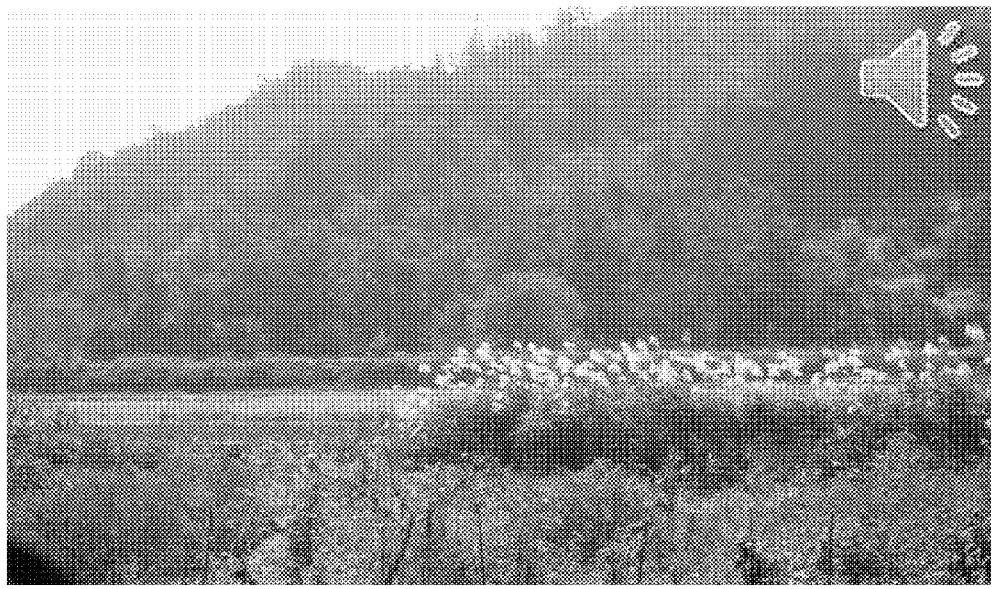

Referring to FIGS. 8A, 8B, 8C and 8D, the vehicle 100 may acquire an image during driving, e.g. an image of a highway as shown in FIG. 8A, an image of a park as shown in FIG. 8B, an image of a lake as shown in FIG. 8C, and/or an image of a field as shown in FIG. 8D. According to the embodiments described above, the vehicle 100 may output a sound, e.g. a sound effect and/or music, corresponding to the acquired image.

As is apparent from the above, according to an embodiment of the disclosure, the vehicle and the control method thereof can provide an occupant with a sound that suits an external environment during driving.

For instance, the vehicle and the control method thereof can enable the occupant to enjoy an external environment visually as well as audibly during driving, which makes the occupant feel like the occupant is in an open space, not in a vehicle, and thereby can provide emotional comfort. Also, the sound that harmonizes with the external environment can make the occupant feel healed emotionally.

Embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), magnetic tapes, magnetic disks, flash memories, and an optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle comprising:
   a camera;
   a speaker; and
   a controller electrically connected to the camera and the speaker, wherein the controller is configured to:
      acquire a first external image outside the vehicle from the camera;
      input the first external image to a pre-trained first neural network;
      extract a first feature corresponding to the first external image;
      compare the first feature and pre-stored features corresponding to a plurality of sound samples; and
      control the speaker to output a first sound sample among a plurality of sound samples.

2. The vehicle of claim 1, wherein the pre-trained first neural network is configured to extract a feature for identifying terrain information corresponding to the input first external image or emotional information predetermined to correspond to the terrain information.

3. The vehicle of claim 1, wherein the controller is configured to:
   identify a second feature that is most similar to the first feature among the pre-stored features corresponding to the plurality of sound samples using a machine learning model; and
   select the first sound sample corresponding to the second feature.

4. The vehicle of claim 3, wherein the pre-stored features corresponding to the plurality of sound samples are extractable and storable based on learning of a second neural network to which a spectrum image of a time and a frequency is input, after converting each of the plurality of sound samples into the spectrum image of the time and the frequency.

5. The vehicle of claim 4, wherein the second neural network is configured to learn to extract a feature for identifying terrain information corresponding to the input spectrum image or emotional information predetermined to correspond to the terrain information.

6. The vehicle of claim 1, wherein the controller is further configured to:
   acquire a second external image through the camera in response to a lapse of a predetermined time after acquiring the first external image;
   input the second external image to the first neural network;
   extract a third feature corresponding to the second external image;
   compare the third feature and the pre-stored features corresponding to the plurality of sound samples; and
   select the first sound sample or a second sound sample different from the first sound sample among the plurality of sound samples.

7. The vehicle of claim 6, wherein, when the first sound sample is selected from the plurality of sound samples and the first sound sample includes a first sound effect, the controller is configured to set a number of repeated playbacks of the first sound effect to be less than a predetermined maximum number of repetitions, and
   when the second sound sample is selected from the plurality of sound samples and the second sound sample includes a second sound effect, the controller is configured to set a number of repeated playbacks of the second sound effect to be a predetermined minimum number of repetitions.

8. The vehicle of claim 6, wherein, when the first sound sample is selected from the plurality of sound samples and the first sound sample includes a first music, the controller is configured to set a playback time of the first music to be a predetermined maximum playback time, and
   when the second sound sample is selected from the plurality of sound samples and the second sound sample includes a second music, the controller is configured to set a playback time of the second music to be a predetermined basic playback time.

9. The vehicle of claim 8, wherein in response to the second sound sample being selected from the plurality of sound samples and the second sound sample including the second music, the controller is configured to apply a filter for fading out to data of the first music and apply a filter for fading in to data of the second music.

10. A control method of a vehicle, the control method comprising:
    acquiring a first external image outside the vehicle through a camera;
    inputting the first external image to a pre-trained first neural network;
    extracting a first feature corresponding to the first external image;
    comparing the first feature to pre-stored features corresponding to a plurality of sound samples; and
    outputting a first sound sample among the plurality of sound samples based on a result of the comparing.

11. The control method of claim 10, wherein the pre-trained first neural network extracts a feature for identifying terrain information corresponding to the input first external image or emotional information predetermined to correspond to the terrain information.

12. The control method of claim 10, further comprising:
    identifying a second feature that is most similar to the first feature among the pre-stored features corresponding to the plurality of sound samples through a machine learning model; and selecting the first sound sample corresponding to the second feature.

13. The control method of claim 12, wherein the pre-stored features corresponding to the plurality of sound samples are extracted and stored based on learning of a second neural network to which a spectrum image of a time and a frequency is input, after converting each of the plurality of sound samples into the spectrum image of the time and the frequency.

14. The control method of claim 13, wherein the second neural network learns to extract a feature for identifying terrain information corresponding to the input spectrum image or emotional information predetermined to correspond to the terrain information.

15. The control method of claim 10, further comprising:
acquiring a second external image through the camera in response to a lapse of a predetermined time after acquiring the first external image;
inputting the second external image to the first neural network;
extracting a third feature corresponding to the second external image;
comparing the third feature and the pre-stored features corresponding to the plurality of sound samples; and
selecting the first sound sample or a second sound sample different from the first sound sample among the plurality of sound samples based on result of the comparing.

16. The control method of claim 15, further comprising:
selecting the first sound sample from the plurality of sound samples, wherein the first sound sample includes a first sound effect, and setting a number of repeated playbacks of the first sound effect to be less than a predetermined maximum number of repetitions; or
selecting the second sound sample from the plurality of sound samples, wherein the second sound sample includes a second sound effect, and setting a number of repeated playbacks of the second sound effect to be a predetermined minimum number of repetitions.

17. The control method of claim 15, further comprising:
selecting the first sound sample from the plurality of sound samples, wherein the first sound sample includes a first music, and setting a playback time of the first music to be a predetermined maximum playback time; or
selecting the second sound sample from the plurality of sound samples, wherein the second sound sample includes a second music, and setting a playback time of the second music to be a predetermined basic playback time.

18. The control method of claim 17, further comprising in response to selecting the second sound sample from the plurality of sound samples and the second sound sample including the second music, applying a filter for fading out to data of the first music and applying a filter for fading in to data of the second music.

19. A control method of a vehicle, the control method comprising:
identifying a sound sample;
determining whether the sound sample includes a sound effect or music;
in response to determining the sound sample includes the sound effect, determining whether the sound sample has changed;
in response to determining the sound sample has not changed, resetting a number of playbacks of the sound effect with a maximum number of repetitions;
in response to determining the sound sample has changed, setting the number of playbacks of the sound effect to be a single time; and
preparing an audio stream of the sound effect.

20. The control method of claim 19, further comprising:
determining the sound sample includes the music;
determining whether the sound sample has changed;
in response to determining that the sound sample has not changed, setting a playback time of previous music to be a maximum playback time;
in response to determining that the sound sample has changed, setting the playback time of the music as a first preset time and adding a fade-out filter to the previous music and a fade-in filter to the music; and
preparing an audio stream of the music.

* * * * *